Oct. 16, 1934.  F. X. SOMMERS  1,976,894
ICE CREAM MACHINE
Filed April 13, 1933  5 Sheets-Sheet 1

INVENTOR
Frank X. Sommers,
BY
ATTORNEYS

Oct. 16, 1934.  F. X. SOMMERS  1,976,894
ICE CREAM MACHINE
Filed April 13, 1933    5 Sheets-Sheet 3

INVENTOR
Frank X. Sommers,
BY
ATTORNEYS

Oct. 16, 1934.  F. X. SOMMERS  1,976,894
ICE CREAM MACHINE
Filed April 13, 1933  5 Sheets-Sheet 5
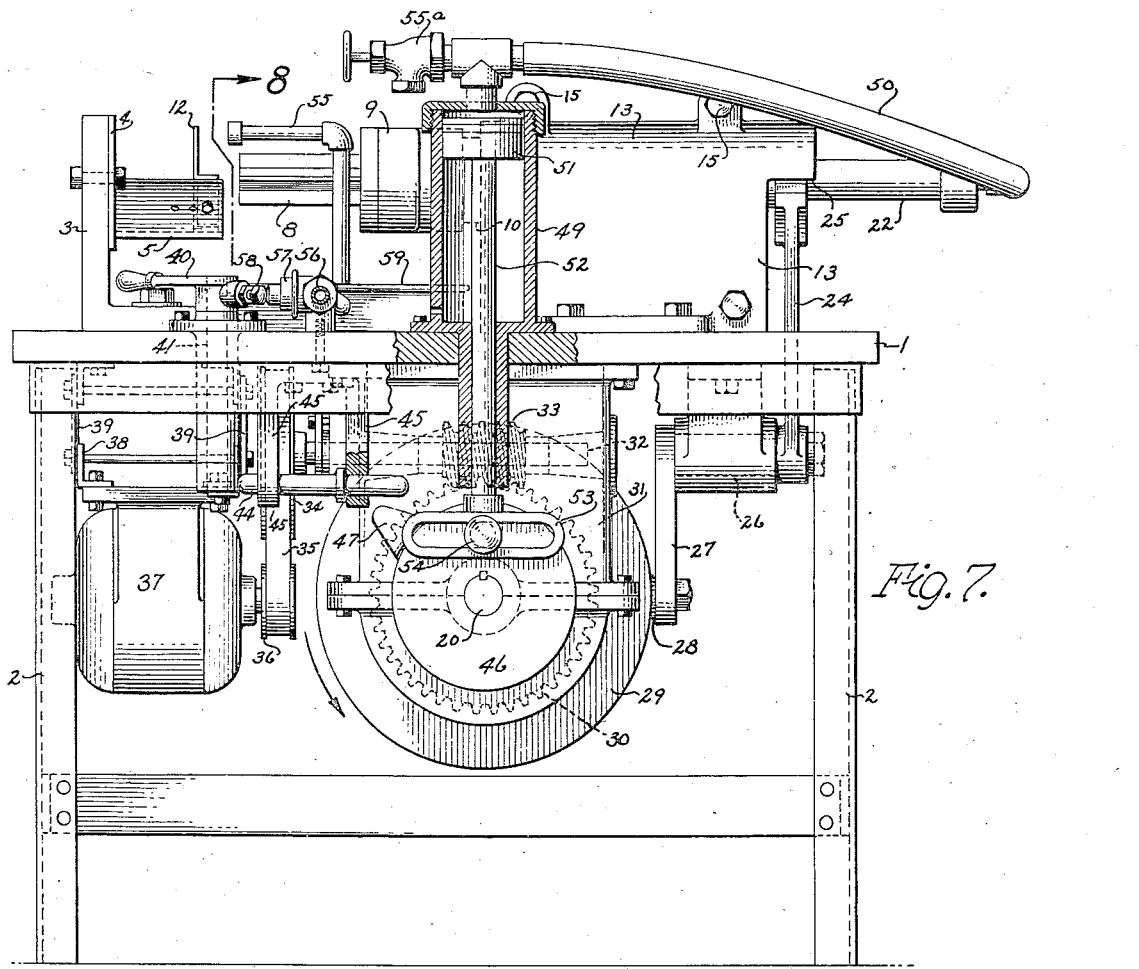

Patented Oct. 16, 1934

1,976,894

UNITED STATES PATENT OFFICE 1,976,894

ICE CREAM MACHINE

Frank X. Sommers, Detroit, Mich., assignor to Neal-Sommers Corporation, Detroit, Mich., a corporation of Michigan Application April 13, 1933, Serial No. 665,988

11 Claims. (Cl. 107—1)

This invention relates to a device or machine for forming cakes, blocks or other forms of confections or edible sweetmeats with portions formed of different ingredients or colors, and an object of the present invention is to provide a device or machine for removing a portion from a block of icecream or other confection and placing this removed portion within the space provided by the removal of a like portion from another confection; a further object being to provide means for automatically transferring such removed portions from one to another of such confections and to remove and replace central portions of irregular shapes in cross section, whereby the product is made more attractive in appearance, particularly when the blocks are made of different colored materials.

It is also an object to provide a tubular cutter for removing a central portion of the block or cake of confection, and to provide means for holding within this cutter, the received portion of the cake and for ejecting the same therefrom in timed relation to the operation of said cutter. A further object is to provide a machine having a plurality of such cutters and means for projecting, retracting, and swinging said cutters to automatically remove the centers or portions of a plurality of confections and transfer such removed portions from one to another of said confections, a further object being to provide means for cleaning and warming these cutters so that they will readily pierce the icecream block, and so that the portion of the confection removed thereby, may be readily ejected therefrom.

A further object is to provide a machine which is automatic in all of its movements and embodies driving means, said machine being comparatively simple in construction and efficient in operation, and further embodying certain other new and useful features, all as hereinafter more fully set forth, and particularly pointed out in the appended claims, reference being had to the accompanying drawings in which Figure 1 is a plan view of a machine illustrative of an embodiment of the present invention;

Fig. 7 is an elevation of the right hand side of the machine or the side opposite that shown in Fig. 4, and with portions broken away and in section to more clearly disclose the construction;

Fig. 8 is a detail showing the cutters or core removing and transferring members in end elevation together with adjacent parts of the machine;

Fig. 9 is a perspective view of a confection or block of icecream as prepared by the machine, and Fig. 10 is a transverse section of Fig. 9.

Figure 1:
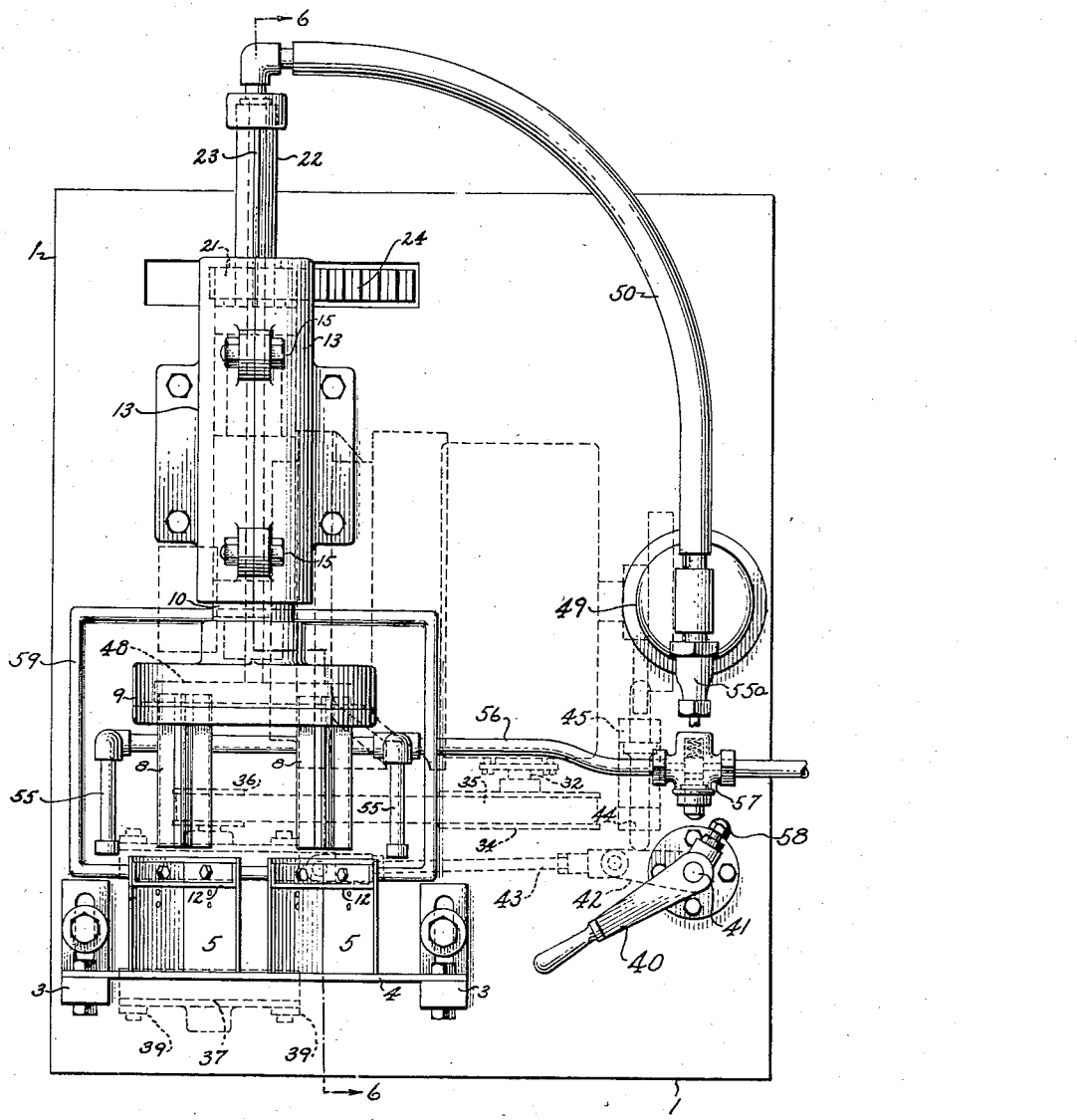
Figure 2:
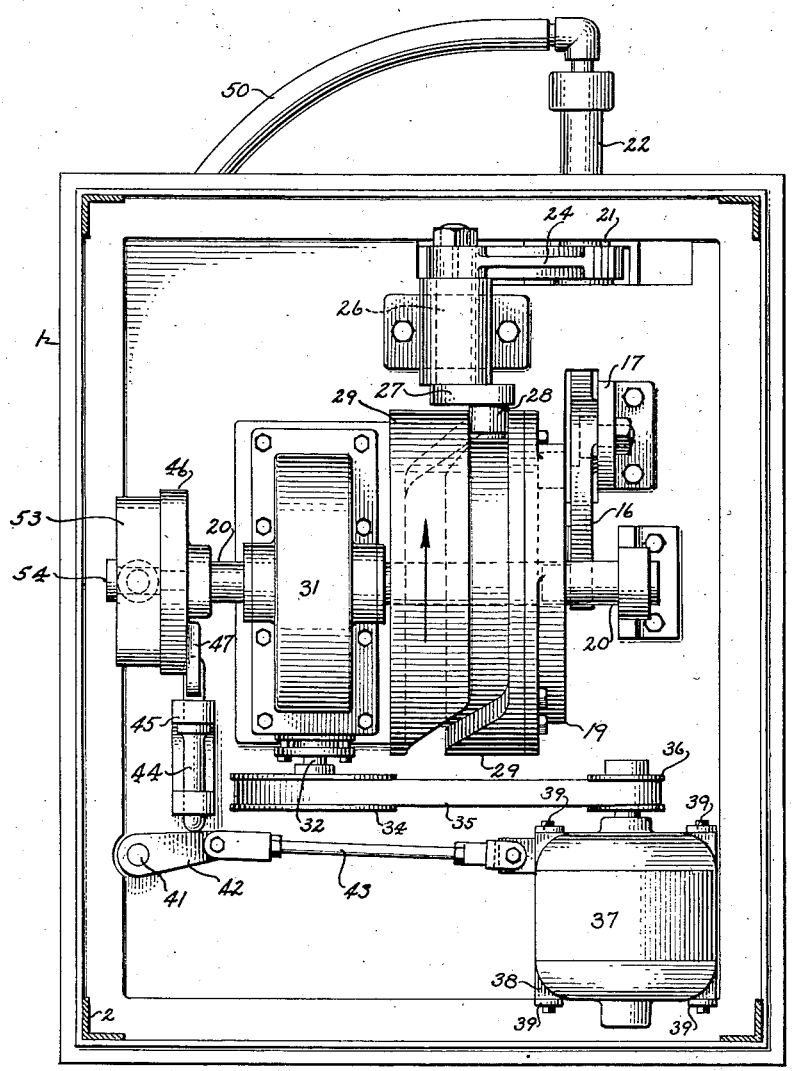
Fig. 2 is an inverted plan view of the same.
Figure 3:
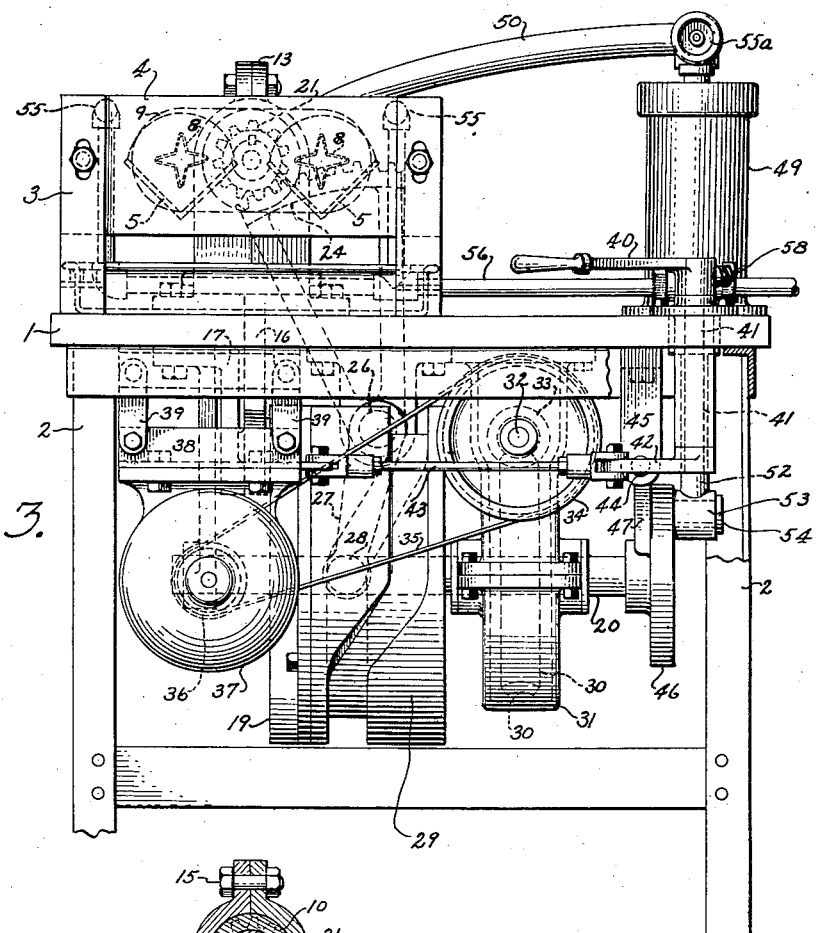
Fig. 3 is an end elevation of what may be termed the front end of the machine.
Figure 5:
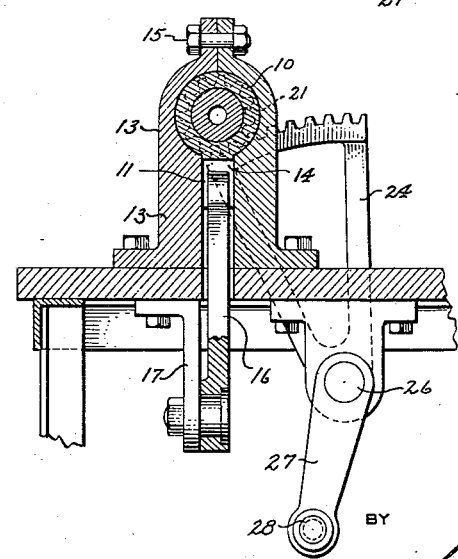
Fig. 5 is a sectional detail substantially upon the line 5—5 of Fig. 4.

As shown in the drawings 1 indicates a suitable table mounted upon a supporting frame 2, and mounted upon this table adjacent the front end thereof, is a pair of suitable brackets 3 having a transverse plate 4 adjustably secured thereto and to which plate is secured a pair of V-shaped troughs 5 to receive and support the rectangular shaped blocks 6 of icecream or other confection to be operated upon by the machine.

The machine as illustrated, is particularly adapted for operating upon rectangular blocks of frozen material, such as icecream or the like and this machine is adapted to remove a central portion 7 of each one of these blocks and transfer the removed portion from one to the other of the blocks so that the finished product will have an attractive appearance and may be and preferably is made up of two different kinds or colors of material, the removed and replaced portion being of a different kind or color from that of the body of the block. This is accomplished by forming the two blocks 6 of dissimilar materials or colors so that the removed central portion or core 7 of one block may be placed within the opening in the other block formed by the removal of the core from that block.

The finished confection is therefore given an attractive appearance that may have a core or central portion of a different color or material from that of the body of the confection, and this central portion or core may be given any desired shape in cross section, to increase the attractive appearance of the confection, by shaping the cutters in accordance with the desired shape of core.

To simultaneously sever the central portions or cores 7 from the two blocks, a pair of cutters 8 of tubular form are supported at their rear ends by a suitable hollow head 9 which is detachably secured to the forward end of a longitudinally reciprocable hollow spindle 10 mounted within a suitable supporting guideway 11 secured upon the table 1.

Figure 6:
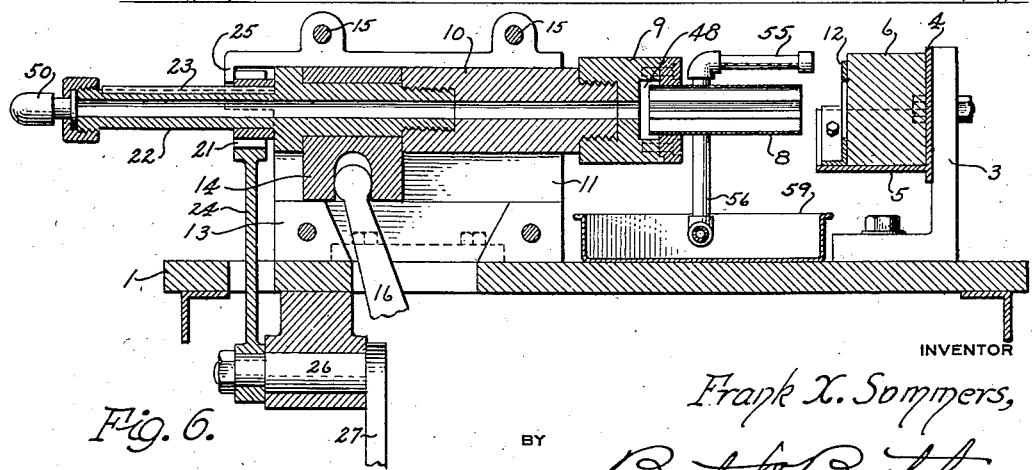
Fig. 6 is a longitudinal sectional detail substantially upon the line 6—6 of Figure 1.

The head 9 is elongated and the tubular cutters 8 are mounted therein at their rear ends, each offset laterally from the longitudinal axis of rotation of the spindle 10 and said head 9, these cutters being thus normally supported with their forward open ends directly opposite the central portions of the two blocks 6 or rectangular confections which are placed within the V-shaped troughs 5 and thus stationarily supported in position to be pierced or cut by the cutters 8 when the same are advanced longitudinally to project them through suitable openings in the back plates 12 which form a backing for the rear ends of the blocks 6 as clearly shown in Fig. 6, when said blocks are in place within the supporting troughs 5 between said plates 12 and the plate 4 of the supporting bracket structure 3.

To provide for confection blocks 6 of different dimensions, the plates 12 are adjustably secured within the troughs 5 in any suitable manner so that they may be adjusted in the direction of the length of the troughs to provide for confections of different lengths, and the openings in these plates 12 may be varied to conform to the shape and size of the cutters 8, which cutters may also be of different cross sectional shapes and sizes to remove cores of different shapes and sizes from the blocks of confection. Further the single plate 4 which supports the two troughs 5, may, as shown, be adjustably secured to the upright portions of the supporting brackets 3, to adjust the troughs vertically relative to the longitudinal axes of the cutters, and these brackets may be adjustably secured to the table 1 in any suitable manner so that said troughs may be adjusted longitudinally toward or from the forward ends of the cutters.

The rotatable and longitudinally reciprocable spindle 10 which carries the hollow head 9 and tubular cutters 8, is mounted within a bearing block 13 bolted to the table top 1, and this block preferably comprises two parts each formed with a half bearing for the spindle and with half of the guideway 11 within which a suitable yoke 14 is adapted to reciprocate, said yoke being secured in any suitable manner to the spindle to move said spindle endwise and to permit free rotation thereof within the yoke, the said parts of said bearing block being secured together, face to face, by transverse bolts 15 with said spindle and yoke therebetween. To reciprocate the spindle longitudinally, the upper end of the long arm of a bell crank 16 is loosely engaged with said yoke, said arm being extended upward through a slot in the base of said block and through a slot in the table top from its pivotal support upon a bracket 17 secured to the underside of the table, the short arm of said bell crank being provided with a roller 18 to engage a cam slot in a cam 19 mounted upon a shaft 20 supported in bearing brackets depending from the underside of the table.

Figure 4:
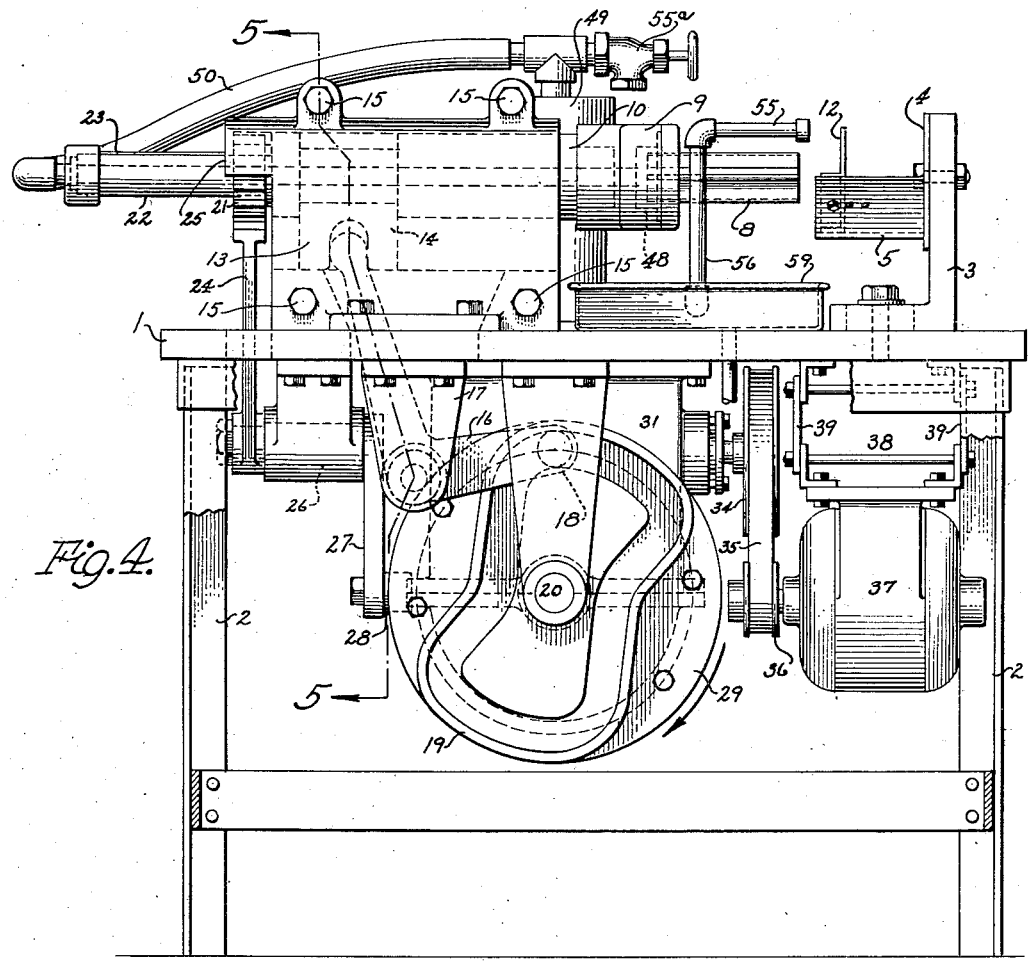
Fig. 4 is a side elevation of the left hand side of the machine, with portions of the supporting frame broken away and in section.

When the cam 19 is in the position shown in Fig. 4, the roller 18 is in a portion of the cam slot with the bell crank in such a position that the spindle 10 is at the rear end of its stroke and as a portion of the cam slot within which the roller moves at this time, is concentric with the axis of the cam, the spindle will be held for a time at the rear end of its stroke, but further turning of the cam will rock the bell crank and move the spindle forwardly to project the cutters 8 through the blocks of confection supported in alinement therewith, such movement taking place during approximately one-quarter of the revolution of the cam 19. The cam slot is so shaped that further turning of the cam will retract the cutters 8, withdrawing them from the blocks with the severed cores of the blocks within the cutters. The cam slot is so formed that there is then another dwell in the movement and the cutters are held in retracted position with the cores of the ice cream blocks within the cutters and it is during this dwell in the reciprocating movement of the cutters that the spindle 10 is given a half rotation to swing the head 9 and the cutters from the position in which they were in when retracted from the blocks 6, to a position where each will be opposite and in alinement with the hole in the other block from which the core of ice cream has just been removed, and therefore upon further turning of the cam 19 and advance of the cutters, the core which was cut from one block will be carried by the cutter into the opening left in the other block, thus transferring the core from one block to the other.

To rotate the spindle 10 in timed relation to the reciprocation thereof, a small gear is mounted upon a tubular end extension 22 of the spindle 10, said extension being free to move through the gear upon reciprocation of the spindle, by connecting the gear to the tube by means of a spline 23 and providing a rack arm 24 to engage and rotate the gear and thus rotate the spindle, the gear 21 being held against longitudinal movement with the reciprocation of the spindle, but free to rotate with the spindle, by providing a flange 25 on the bearing block 13 to engage over the gear and thus confine it between said flange and the end of the block.

The rack arm 24 is swung in engagement with the gear 21 to rotate the spindle 10, by securing the lower end of this arm to a short shaft 26 mounted in a suitable bearing depending from the lower side of the table, and the opposite end of this shaft is provided with an arm 27 having a roller 28 on its free end to engage within a cam groove formed in the periphery of a cam wheel 29, to the side of which cam wheel the cam 19 is secured, said cam wheel being also mounted upon the shaft 20.

The cam groove in the wheel 29 within which the roller 28 runs is so positioned relative to the cam groove in the cam 19 that the rack arm 24 will be swung in proper timed relation to the reciprocation of the spindle so that the spindle and head 9 carrying the cutters 8 will be given a half rotation while the spindle is held in fully retracted position. Therefore the swinging of the cutters to transfer the severed core from one block to the other is accomplished while the cutters are in retracted position with the cores of the confection held therein, whereby upon advance of the cutters by further rotation of the cam 19, they will again enter the blocks of confection and when again retracted will leave the core which was taken from one block within the center of the other block.

The cam shaft 20 is power driven to rotate the cam 19 and cam wheel 29, through the medium of a large worm gear 30 on said shaft within a suitable casing 31 which is suspended from the lower side of the table 1 and provides suitable bearings for a short transverse shaft 32 upon which is secured a worm 33 in mesh with the wheel 30. Upon the outer end of this short shaft 32 is secured a pulley 34 over which is trained a belt 35 for transmitting motion from a small pulley 36 on the shaft of an electric motor 37 suspended from the table 1 by means of a yoke 38 including four links 39 pivotally attached to said table at one end and at their opposite ends to the base of the motor to swing in the direction of the length of the belt, so that by swinging the motor, the belt may be tightened or loosened to cause it to transmit or to stop the transmission of motion from said motor to the short worm shaft 32.

To manually swing the motor 37 for the purpose of stopping or applying the driving power of the motor, a control handle 40 is secured to the upper end of a vertical shaft 41 mounted in a suitable bearing in the table 1 and extending downward therethrough, said shaft having an arm 42 secured to its lower end to swing in a horizontal plane, and pivotally connected to the free end of this arm, is one end of a connecting rod 43, the opposite end of which is pivotally connected to an ear on the motor base. This connecting rod is so arranged that when said arm 42 is swung to swing the motor and tighten said belt 35, said arm will come into contact with the end of a suitable stop pin 44 mounted to slide within a suitable bracket 45 depending from the lower side of the table 1, the arrangement being such that said arm 42 is stopped by said pin 44, just after it has swung past center or a line drawn through the axis of the pivot of said arm or shaft 41 and the pivot of attachment of the opposite end of the rod 43 with the motor. This swinging of said arm 42 to this position, puts the belt 35 under tension and this tension of said belt, holds the said arm against said stop pin with said belt under driving tension.

To automatically stop the transmission of motion at the end of each cycle of operation of the machine, a disk 46 is secured to the end of the shaft 20 adjacent the bracket 45 within which the pin 44 slides, and projecting from this disk is a lug 47 to engage the projecting end of the pin 44 and move the same endwise against the arm 42 and swing said arm past center to release the tension on the belt 35 and stop the transmission of motion, said lug being so located relative to the cam grooves of the cams 19 and 29 that after the cutters 8 have been projected into the confections and then retracted by the cam 19 to retract the severed cores therefrom; the head 9 and spindle 10 then given a half rotation by the cam 29; the cutters then again advanced and retracted by the cam 19 to transfer and replace the cores, thus finishing the operation, the machine will be automatically stopped by said lug 47 coming into contact with and moving said stop pin 44 endwise to swing the arm 42 past center and relieve the tension of the belt 35. The operator may then remove the finished confections from the supporting troughs 5 and put others therein to be operated upon when he again starts the machine by throwing the handle 40.

When the tubular cutters 8 are projected endwise through the blocks 6 of icecream, the cores 7 severed thereby might not remain in the cutters and be removed with the retraction of the cutters, and further, when these cutters are again projected to place these cores in the blocks after the transfer from one to the other of the blocks is effected by the half rotation of the head 9, and are then again retracted to leave the cores in the blocks, these cores might stay in the cutters instead of remaining in the blocks as the cutters are withdrawn. To insure the proper removal and replacement of these cores by said cutters, a partial vacuum is created in the chamber 48 of the head 9 into which chamber the rear ends of the tubular cutters 8 are open, this vacuum being created while the cutters are being first advanced and then retracted, this vacuum exerting a suction or pull upon the cores contained in the cutters to hold said cores therein as the cutters are retracted to remove said cores from the blocks; and then when the cutters are again advanced to place the cores in the blocks, air is forced into the chamber 48 to force the cores out of the cutters as these cutters are retracted to leave the cores in the blocks.

This partial vacuum and compression within the chamber of said head is created in proper timed relation to the operation of the cutters, by providing an air cylinder 49, the upper end of which is connected with the rear end of the tubular extension 22 of the hollow spindle 10, by means of a flexible conduit or air hose 50, the forward end of the bore of the spindle being open into said chamber 48; and within this cylinder is a piston 51 having a piston rod 52 extending through a suitable bearing at the lower end of the cylinder and through the table 1 to a point adjacent the face of the disk 46 on the end of the shaft 20 where said rod is provided with a cross head 53 engaged by a pin or roller 54 on said disk, so that upon rotation of the shaft 20 and disk 46, the piston will be reciprocated in timed relation to the movement of the cutters 8 which are operated by the cams 19 and 29 on said shaft 20. To regulate the amount of suction or compression created in the chamber 48 by the operation of the air pump comprising the cylinder 49 and piston therein, a hand operated valve 55a is provided at the upper end of the cylinder.

Should the blocks 6 of icecream be frozen very hard or should the confections be of a material or consistency which would be difficult to cut or penetrate by the cutters, or should the material be of a sticky nature so that it would adhere to the cutters, their proper operation will be insured by providing suitable means for spraying these cutters at the proper time, to warm the cutters so that they will more easily penetrate the confections and so that the cores will not adhere thereto, but may be readily ejected therefrom, and further, to wash away any of the material which may adhere to these cutters. Such spraying with any suitable fluid is effected by means of spray nozzles 55 positioned at the sides of the cutters 8 and extending parallel therewith, these nozzles being mounted upon a supply pipe 56 having a control valve 57 therein located adjacent the handle 40 where it is secured to the shaft 41, so that an adjustable abutment 58 projecting laterally from the hub of said handle, will engage the stem of said control valve and operate the same to turn on the spray when said handle is thrown by the pin 44 which is automatically projected by the lug 47 at the end of the cycle of operation of the machine, to stop the machine. Spraying of the cutters is thus effected at the proper time while the machine is at rest, and the spray may be cut off by a slight movement of the handle to move the abutment 58 out of contact with the valve stem without starting the machine. To catch the drip from the spray, a pan 59 is placed upon the table beneath the cutters.

Obviously, a machine embodying the underlying ideas disclosed in the construction as shown and described, may be constructed without including the power drive, automatic operation, spraying means, and other features, and other changes may be made in the construction and arrangement of parts, without departing from the spirit of the invention. Such changes are contemplated and I do not, therefore, limit myself to the construction shown.

Having thus fully described my invention what I claim is:

1. A device of the character described including means for supporting an edible body, means for severing and removing a plurality of portions from said body, and means for moving said severing means and body relatively to transfer one portion severed from said body to a space from which another portion of the body has been severed and removed.

2. A device for the purpose described including means for supporting an edible body, members for simultaneously severing portions from said body, means for moving said members to sever portions from said body, and means for moving said members and supporting means relatively to transfer the portion severed by one member to the space formed by the portion severed by the other member.

3. The combination of means for supporting an edible body, a pair of members to sever and remove portions of said body, and means for effecting a change in the relative positions of said supporting means and said members to transfer the portion severed by one member to the space left by the portion severed by the other member.

4. A machine of the character described including means for holding edible bodies, a plurality of longitudinally reciprocable members for severing and holding portions of said bodies, means for reciprocating said members, and means for moving said holding means and members relatively to place a portion severed from one body by one of said members within the space formed in another body by the removal of a portion thereof by another of said members.

5. A machine for the purpose described including means for holding and supporting a plurality of edible bodies, a plurality of longitudinally reciprocable tubular cutters for severing and receiving portions of said bodies, means for reciprocating said cutters, and means for effecting a change in the relative positions of said holding means and cutters to transfer the severed portion of one body to the space formed in an adjacent body by the removal of a portion of that body by another of said cutters.

6. In a machine of the character described, the combination of means for supporting and holding edible bodies, a plurality of tubular cutters for simultaneously severing and receiving portions of said bodies, a longitudinally reciprocable and rotatable member having a head to which one end of each of said cutters is secured, and means for rotating and reciprocating said member carrying said cutters.

7. In a machine of the character described, the combination of means for supporting edible bodies, a plurality of tubular cutters adapted to be projected through said bodies to sever portions therefrom and receive the severed portions, means for reciprocating said cutters, a longitudinally reciprocable and rotative member for carrying said cutters, means for reciprocating said member to project said cutters through said edible bodies and retract the same therefrom, and means for rotating said member in timed relation to the reciprocation thereof.

8. A machine of the character described including means for supporting a plurality of edible blocks, a plurality of longitudinally reciprocable tubular cutters adapted to pierce said blocks and sever and receive portions thereof therefrom, a rotatable and longitudinally reciprocable member for carrying said cutters and formed with a passage communicating with the open rear ends of said cutters, means for withdrawing air from said passage to creat a suction upon the material contained within said cutters and to force air into said passage for ejecting the material severed from said bodies and contained within said cutters, and means for reciprocating and rotating said member carrying said cutters.

9. A machine of the character described comprising a plurality of V-shaped troughs to receive and hold edible blocks, a plurality of longitudinally reciprocable tubular cutters to pierce said blocks and sever and receive portions thereof, the ends of said cutters being open, a longitudinally reciprocable and rotative hollow spindle, an elongated head for carrying said cutters and having a chamber into which the rear ends of said cutters open, means for reciprocating said spindle head and cutters and for rotating said spindle to shift the position of said cutters from one to another of said blocks, and means for creating a partial vacuum in said chamber of said head in timed relation to the reciprocation of said spindle.

10. In a machine of the character described, the combination of means for supporting and holding a plurality of edible blocks of frozen material, a longitudinally reciprocable tubular cutter positioned with its forward open end opposite each of said blocks, means for reciprocating said cutters, means for effecting a change in the relative position of each block and its cutter to transfer the severed portion of the block contained in each cutter to the space in an adjacent block formed by the removal of a portion from said block by an adjacent cutter, and means operative in timed relation to the reciprocation of said cutters for applying a warming medium to each of said cutters.

11. In a machine of the character described, the combination of means for adjustably supporting and holding a plurality of edible blocks of frozen material, a longitudinally reciprocable hollow spindle rotatively mounted within a bearing and provided with a hollow head, tubular cutters carried by said head with their rear ends in open communication with the interior of said head, there being a cutter for each block adapted to pierce the block upon forward movement of the spindle, means for reciprocating the spindle, means for rotating said spindle in timed relation to its reciprocation, an air pump communicating with said hollow spindle, and means for operating said pump in timed relation to the reciprocation of the spindle.

FRANK X. SOMMERS.